United States Patent Office 3,397,924
Patented Aug. 20, 1968

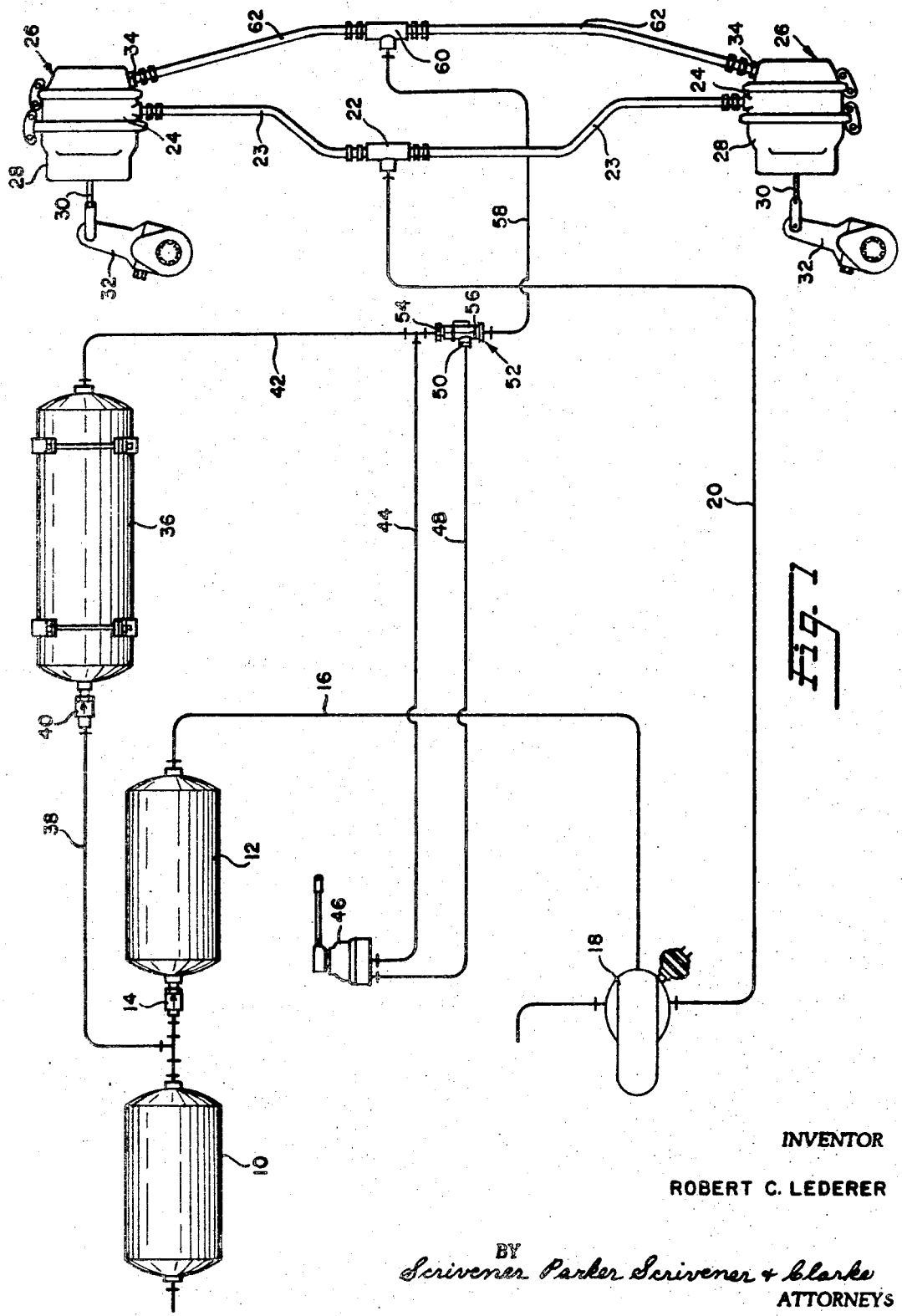

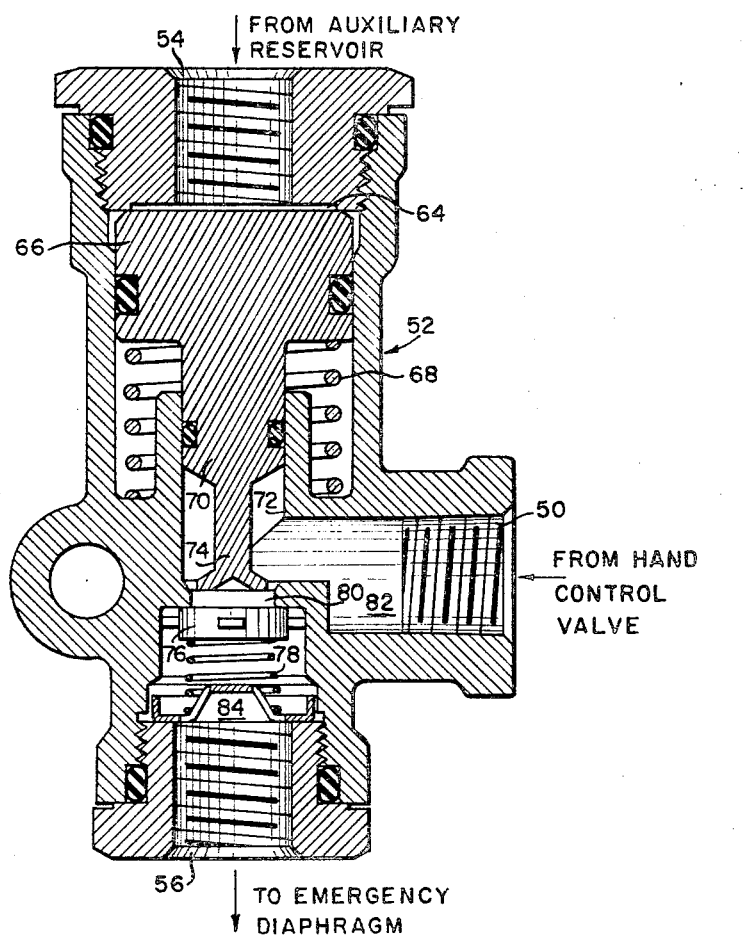

3,397,924
FLUID PRESSURE BRAKE SYSTEM
Robert C. Lederer, Concord, Calif., assignor to Bendix-Westinghouse Automotive Air Brake Company, Elyria, Ohio, a corporation of Delaware
Filed Nov. 15, 1965, Ser. No. 507,907
5 Claims. (Cl. 303—13)

This invention relates to fluid pressure brake systems and more particularly to a fluid pressure brake system which includes emergency means for applying the brakes in the event of failure of normal service fluid pressure, the principal object of the invention being the provision of means for selectively applying the brakes in an emergency at the will of the operator and including the further feature that in the event the emergency supply of fluid pressure has fallen to a predetermined low level, pressure cannot be released from the brakes until there is sufficient pressure supply in the system to enable the reapplication of the brakes immediately following the release of an emergency application.

More particularly, it is an object of the invention to provide in a fluid pressure braking system of the type employing double diaphragm actuators wherein one of the diaphragms is a service actuator and the other an emergency actuator, manual means for supplying pressure to the emergency diaphragm upon failure of the normal service pressure with the pressure on the emergency diaphragm being capable of being applied and released at the will of the operator until such time as the emergency pressure source falls to a predetermined low value whereby, in accordance with the invention, an emergency application cannot be released at the will of the operator until such time as the emergency or service pressure supply has been restored to a predetermined minimum value.

Other objects and their attendant advantages will become apparent as the following detailed description is read in conjunction with the accompanying drawings wherein:

FIG. 1 is a schematic diagram of a braking system employing the features of the present invention; and FIG. 2 is an enlarged vertical cross-sectional view of a valve employed in the system of the invention.

Referring now to the drawings and particularly to FIG. 1, the numerals 10, 12 indicate the usual respective wet and dry service reservoirs which are adapted to be supplied with service braking pressure from a compressor (not shown). As customary, the dry reservoir 12 is supplied with fluid through a one-way check valve 14 with the outlet of the reservoir 12 being connected by way of a conduit 16 to the inlet port of a conventional self-lapping brake valve 18 having an outlet port which is connected by way of a conduit 20, a T 22 and conduits 23 to the service ports 24 of of double diaphragm actuators 26. Double diaphragm actuators are sufficiently well known to require no detailed description but broadly they comprise an actuator housing 28 having therein service and emergency diaphragms with the normal service pressure being applied between the diaphragms so that the emergency diaphragm is pushed idly against the back wall of the housing and serves no function while the service diaphragm is expanded in the usual manner to operate against a push plate and actuating rod 30 which operates the usual slack adjuster 32 to apply the brake. If it is not possible or not desirable to apply the brake by way of the service ports, the brakes can be applied by an emergency application of fluid pressure to the emergency port 34 of each actuator 26 so that the emergency diaphragm is expanded to pick up the service diaphragm, which is now idle, and move the latter and the push plate in a brake applying direction. An emergency application of the brakes can normally be released at the will of the operator by moving the emergency braking valve to a brake release position.

In accordance with the present invention, the system of the invention operates essentially as described above with one important exception and that is in the event of a decrease in pressure of the emergency supply to a predetermined low value the operator no longer has the option of releasing an emergency application of the brakes; that is to say, when the emergency fluid pressure supply has fallen to a value which would not permit the immediate reapplication of the emergency brakes upon a release thereof, means are provided in the system of the invention for automatically disconnecting some of the brake controls normally available to the operator with the result that emergency pressure is trapped in the emergency brake chambers to retain the brakes applied until pressure of a minimum value is restored in the system.

Referring now again to FIG. 1, it will be observed that an emergency reservoir 36 is supplied with emergency fluid pressure by way of a conduit 38 connected at one end between the reservoirs 10, 12 and at the other to the inlet of a one-way check valve 40. The outlet of the emergency reservoir 36 is connected by way of conduits 42, 44 with the inlet port of a hand-operated brake valve 46 having an outlet port which is connected by way of a conduit 48 with the inlet port 50 of an automatic control valve 52 which affords an important part of the system of the invention. The valve 52 is provided with a control port 54 which is connected directly to the emergency reservoir 36 by way of the aforementioned conduit 42. The valve 52 also has a delivery port 56 which is connected by way of a conduit 58 with a T 60 whose outlets are connected by way of conduits 62 with the aforementioned emergency ports 34 of the double diaphragm brake chamber 26.

With reference now to FIG. 2 it will seem that the control port 54, which is connected directly to the emergency reservoir 36, lead to a control chamber 64 within the valve 52 which slidably receives a control piston 66 normally urged by a spring 68 to the upper position of the drawing. Integral with the piston 66 is a plunger 70 which is slidable and sealingly received within a bore 72 within the valve body and depending from the plunger 70 is a valve actuating member 74 which, in the no-air position of the drawing, is spaced above a check valve 76 urged by a spring 78 to closed position against a port 80 which, when the valve 76 is open, serves to connect an inlet cavity 82 with a delivery cavity 84, these cavities being respectively connected to the inlet port 50 and the delivery port 56 which, in turn, are connected to the hand valve 46 and to the emergency port of the double diaphragm respectfully.

In operation, assuming first a situation where normal emergency pressure exists in the reservoirs 10, 12, and hence also in the emergency reservoir 36. When the operator wishes to apply the brakes he merely depresses the pedal of the brake valve 18 whereupon service pressure is delivered to the serive ports 24 of the double diaphragm actuators to apply the brakes in the normal manner. Under these circumstances, because a normal pressure above a predetermined low level exists in the emergency reservoir 36, this pressure is fed by way of the conduit 42 to the control port 54 of the valve 52 where it acts on the piston 66 to move this downwardly until the valve actuating member 74 engages the check valve 76 to unseat the same whereby the inlet port 50 and the delivery port 56 are freely connected. Should now for some reason, the operator wish to apply fluid pressure to the emergency diaphragms he can, at will, by operating the manual control valve 46 supply braking pressure to the emergency port 34 of the double diaphragm actuators to expand the emergency diaphragms and set the brakes. When the operator wishes to release the emergency application, he merely moves the manual valve to the brake release position whereupon emergency pressure is connected to atmosphere in the conventional manner by way of ports 56, 50 of the valve 52, and the usual atmosphere port in the hand valve 46.

For purposes of illustration, let it now be assumed that available service pressure has been lost but that the pressure trapped in the emergency reservoir 36 is still above a predetermined low value. Under these circumstances, the check valve 76 in the valve member 52 is retained open by the emergency pressure acting on top of the piston 66 and the operator can apply and release the emergency brakes at will in the usual manner by manipulating the manual control valve 46. Let it now be assumed that the emergency pressure 36 has fallen below a predetermined safe value with this value being correlated with the force of the spring 68 in the valve body 52 so that the piston 66 moves to the upper position as shown in FIG. 2 and the check valve 76 moves to its closed position with the parts assuming the position of FIG. 2 wherein the flow of fluid from the delivery port 56 back through the valve body to the delivery port 50 is positively prevented by the check valve 76.

With the pressure now assumed to be less than the predetermined safe value, should the operator now operate the manual control valve 46 to effect an emergency application of the brakes, emergency fluid pressure, as before, would flow from the emergency reservoir through the inlet port 50 of the valve 52, where it would then unseat the check valve 76, and continue to flow to the emergency diaphragms by way of the delivery port 56 to effect an emergency application of the brakes. However, should the operator now attempt to release the emergency application by operating the manual control valve to its release position nothing would happen and the emergency brake would remain applied because the emergency fluid pressure in the emergency brake chambers would be trapped therein by the check valve 76 so that emergency pressure is unable to flow from the emergency brake chambers through the delivery port 56 back to atmosphere in the normal manner. Thus, under these conditions, the brakes remain applied and they cannot be released by any means normally available to the operator in his usual operating station in the cab of the bus, truck or tractor employing the system of the invention. Furthermore, it will also be seen that the brakes will remain applied until such time as emergency braking pressure above the predetermined low level and sufficient to move the piston 66 downwardly to unseat valve 76 is supplied to the emergency reservoir 36.

From the foregoing description it will be seen that the system of the present invention provides a safety feature over and above that provided by the double diaphragm actuators in that, not only does it permit the full use of the service and emergency brake applying means so long as the respective available pressures are above predetermined values, but should, for any reason following the failure of service pressure, the emergency pressure falls below an acceptable value, then, when the operator makes an emergency application of the brakes he is unable to release the brake until, at least, the emergency supply has been raised above the acceptable low value.

Those skilled in the art will recognize that the system of the invention is susceptible of a variety of changes and modifications without, however, departing from the scope and spirit of the appended claims.

What is claimed is:

1. A fluid pressure brake system including a fluid pressure operated actuator for applying brakes, a source of fluid pressure, and a brake valve between said source and said actuator for controlling the flow of fluid from said source to said actuator to apply the brakes and from the actuator to atmosphere to release the brakes, the invention which comprises a fluid pressure control valve between said brake valve and said actuator and including a body having an inlet port connected to said brake valve, an outlet port connected to said actuator and a control port connected to said source of fluid pressure, a normally closed one way check valve in said valve body between said inlet and delivery ports and arranged to permit the flow of fluid from said inlet to said delivery port but not in the reverse direction, a fluid pressure responsive element in said body exposed to pressure at said control port and being movable from a first position to a second position in response to pressure above a predetermined level, means operated by said element when in its second position for moving said check valve to open position and retaining said check valve open so long as the pressure at the control port is above the predetermined level, and means for automatically returning said element to its first position to enable said check valve to move to its closed position when the pressure at said control port is below said predetermined level whereby pressure delivered by said brake valve to said actuator is trapped therein.

2. A fluid pressure brake system including a double fluid pressure actuator of the type having two parts responsive, respectively, to service and emergency fluid pressure to apply the brakes, a source of service pressure and an independent source of emergency pressure, a service brake valve connected between said service pressure source and the service part of the actuator for controlling a service application of the brakes, an emergency brake valve connected between said emergency source and the emergency part of the actuator for controlling an emergency application of the brakes, check valve means between said emergency valve and the emergency part of the actuator and arranged to permit the flow of fluid from the valve to the actuator but not in the reverse direction, and fluid pressure responsive means connected directly to said emergency reservoir and responsive to a pressure therein above a predetermined level to move said check valve means to open position and retain it in open position to freely connect said emergency valve with said actuator for fluid flow in opposite directions therebetween past said check valve so long as the pressure in said emergency reservoir is above a predetermined level.

3. The system of claim 2 wherein said pressure responsive means is operative to effect movement of said check valve means to its closed position when the pressure in said emergency reservoir falls below said predetermined level.

4. A fluid pressure brake system including a fluid pressure actuator, a source of fluid pressure and a brake valve connected between said source and actuator to control movement of said actuator between brake applied and released positions, a check valve between said brake valve and said actuator and having a normal position wherein the fluid may flow from said brake valve to said actuator but not in the reverse direction, means responsive to pressure in said reservoir for moving said check valve to open position and retaining said valve open so long as the pressure in said reservoir is above a predetermined level whereby fluid may flow freely past said cehck valve in opposite directions between said brake valve and said actuator, and means responsive to pressure in said reservoir below said predetermined level for effecting return of said check valve to its normal closed position.

5. A fluid pressure system comprising a fluid pressure source and a fluid pressure responsive motor, means for selectively applying fluid pressure from said source to said motor and exhausting the applied fluid pressure from said motor, valve means between said last named means and said motor movable between one position permitting the flow of applied and exhaused fluid pressure to and from said motor, respectively, and another position obviating the exhaustion of the applied fluid pressure from said motor, and other means responsive to a fluid pressure at said source in excess of a predetermined value to move said valve means toward its one position and also responsive to fluid pressure at said source less than the predetermined value to permit movement of said valve means toward its other position.

References Cited
UNITED STATES PATENTS 2,489,929  11/1949  Raybould.
3,265,447  8/1966  Bueler _____ 303—52

MILTON BUCHLER, *Primary Examiner.*

T. M. BLIX, *Assistant Examiner.*